(12) United States Patent
Bjontegaard

(10) Patent No.: US 8,218,639 B2
(45) Date of Patent: Jul. 10, 2012

(54) METHOD FOR PIXEL PREDICTION WITH LOW COMPLEXITY

(75) Inventor: Gisle Bjontegaard, Oppegard (NO)

(73) Assignee: Cisco Technology, Inc., San Jose, CA (US)

( * ) Notice: Subject to any disclaimer, the term of this patent is extended or adjusted under 35 U.S.C. 154(b) by 1189 days.

(21) Appl. No.: 12/028,529

(22) Filed: Feb. 8, 2008

(65) Prior Publication Data

US 2008/0192828 A1 Aug. 14, 2008

(30) Foreign Application Priority Data

Feb. 9, 2007 (NO) .................................. 20070794

(51) Int. Cl.
*H04N 11/02* (2006.01)
(52) U.S. Cl. .............................. 375/240.16; 375/240.15
(58) Field of Classification Search .................. 375/240, 375/240.01, 240.02, 240.12, 240.14, 240.15, 375/240.16, 240.22, 240.27
See application file for complete search history.

(56) References Cited

U.S. PATENT DOCUMENTS

| | | | | |
|---|---|---|---|---|
| 5,982,439 A | * | 11/1999 | Parke | 375/240.16 |
| 7,529,302 B2 | * | 5/2009 | Mukerjee et al. | 375/240.15 |
| 2005/0013364 A1 | | 1/2005 | Hsu et al. | |
| 2005/0089097 A1 | | 4/2005 | Kuo et al. | |
| 2005/0276323 A1 | * | 12/2005 | Martemyanov et al. | 375/240.03 |
| 2007/0047649 A1 | * | 3/2007 | Suzuki et al. | 375/240.15 |
| 2007/0146380 A1 | * | 6/2007 | Nystad et al. | 345/582 |

FOREIGN PATENT DOCUMENTS

WO WO 2006/131891 A2 12/2006

OTHER PUBLICATIONS

Xiangyang Ji, et al. "New Scaling Technique for Direct Mode Coding in B Pictures", International Conference on Image Processing (ICIP), vol. 1, XP010784856, Oct. 24, 2004, pp. 469-472.
Alexis Michael Tourapis, et al. "Direct Mode Coding for Bipredictive Slices in the H.264 Standard", IEEE Transactions on Circuits and Systems for Video Technology, vol. 15, No. 1, XP011124673, Jan. 1, 2005, pp. 119-126.
J. Ostermann, et al. "Video Coding with H.264/AVC: Tools, Performance, and Complexity", IEEE Circuits and Systems Magazine, vol. 4, No. 1, XP011111220, Jan. 1, 2004, pp. 7-28.

* cited by examiner

*Primary Examiner* — Andrew Chriss
*Assistant Examiner* — Curtis A Alia
(74) *Attorney, Agent, or Firm* — Oblon, Spivak, McClelland, Maier & Neustadt, L.L.P.

(57) ABSTRACT

A method including: calculating a prediction of a first block of pixels in a second video frame with a temporal position between a first and a third video frame from a first motion vector of pixel position components relative to spatial pixel positions of the first block referring the first video frame and a third motion vector of pixel position components relative to spatial pixel positions of the first block referring the third video frame, wherein a second block of pixels in the third video frame spatially collocated with the first block is predicted from a second motion vector of pixel position components relative to spatial pixel positions of the second block referring the first video frame.

2 Claims, 3 Drawing Sheets

US 8,218,639 B2

METHOD FOR PIXEL PREDICTION WITH LOW COMPLEXITY

CROSS REFERENCE TO RELATED APPLICATION

The present application is related to Norwegian patent application number 20070794, file on Feb. 9, 2007, the entire contents of which are hereby incorporated by reference in its entirety.

FIELD OF THE INVENTION

The invention is related to video compression systems, and in particular to compression/decompression of digital video systems.

BACKGROUND OF THE INVENTION

Transmission of moving pictures in real-time is employed in several applications like e.g. video conferencing, net meetings, TV broadcasting and video telephony.

However, representing moving pictures requires bulk information as digital video typically is described by representing each pixel in a picture with 8 bits (1 Byte). Such uncompressed video data results in large bit volumes, and cannot be transferred over conventional communication networks and transmission lines in real time due to limited bandwidth.

Thus, enabling real time video transmission requires a large extent of data compression. Data compression may, however, compromise with picture quality. Therefore, great efforts have been made to develop compression techniques allowing real time transmission of high quality video over bandwidth limited data connections.

In video compression systems, the main goal is to represent the video information with as little capacity as possible. Capacity is defined with bits, either as a constant value or as bits/time unit. In both cases, the main goal is to reduce the number of bits.

Many video compression standards have been developed over the last 20 years. Many of those methods are standardized through ISO (the International Standards organization) or ITU (the International Telecommunications Union). Besides, a number of other proprietary methods have been developed. The main standardization methods are:
ITU: H.261, H.262, H.263, H.264
ISO: MPEG1, MPEG2, MPEG4/AVC)

The video data undergo four main processes before transmission, namely prediction, transformation, quantization and entropy coding.

The prediction process significantly reduces the amount of bits required for each picture in a video sequence to be transferred. It takes advantage of the similarity of parts of the sequence with other parts of the sequence. Since the predictor part is known to both encoder and decoder, only the difference has to be transferred. This difference typically requires much less capacity for its representation. The prediction is mainly based on picture content from previously reconstructed pictures where the location of the content is defined by motion vectors.

In a typical video sequence, the content of a present block M would be similar to a corresponding block in a previously decoded picture. If no changes have occurred since the previously decoded picture, the content of M would be equal to a block of the same location in the previously decoded picture. In other cases, an object in the picture may have been moved so that the content of M is more equal to a block of a different location in the previously decoded picture. Such movements are represented by motion vectors (V). As an example, a motion vector of (3; 4) means that the content of M has moved 3 pixels to the left and 4 pixels upwards since the previously decoded picture.

A motion vector associated with a block is determined by executing a motion search. The search is carried out by consecutively comparing the content of the block with blocks in previous pictures of different spatial offsets. The offset relative to the present block associated with the comparison block having the best match compared with the present block, is determined to be the associated motion vector.

In H.262, H.263, MPEG1, MPEG2 the same concept is extended so that motion vectors also can take ½ pixel values. A vector component of 5.5 then imply that the motion is midway between 5 and 6 pixels. More specifically the prediction is obtained by taking the average between the pixel representing a motion of 5 and the pixel representing a motion of 6. This is called a 2-tap filter due to the operation on 2 pixels to obtain prediction of a pixel in between. Motion vectors of this kind are often referred to as having fractional pixel resolution or fractional motion vectors. All filter operations can be defined by an impulse response. The operation of averaging 2 pixels can be expressed with an impulse response of (½, ½). Similarly, averaging over 4 pixels implies an impulse response of (¼, ¼, ¼, ¼).

The different frames are typically classified based on the respective coding methods that are being used in the coding and decoding of each frame. There are three different frame types being referred to in the MPEG standards—I-frames, B-frames and P-frames. An I-frame is encoded as a single image, with no reference to any past or future frames.

A P-frame is encoded relative to the past reference frame. A reference frame in this context is a P- or I-frame. The past reference frame is the closest preceding reference frame. Each macroblock in a P-frame can be encoded either as an I-macroblock or as a P-macroblock. An I-macroblock is encoded just like a macroblock in an I-frame. A P-macroblock is encoded using a prediction based on the past reference frame, plus an error term, and to specify the prediction based on the reference frame, one or more motion vectors are included.

A B-frame—as defined in e.g. MPEG1/2—is encoded relative to the past reference frame, the future reference frame, or both frames. The future reference frame is the closest following reference frame (I or P). The encoding for B-frames is similar to P-frames, except that motion vectors may refer to areas in the future reference frames.

Starting from the oldest of the standards mentioned above—H.261, simple forward prediction as illustrated in FIG. 1 was used. Prediction was made frame by frame in temporal order and prediction from the most recent reconstructed frame only was used. This can be referred to as simple forward prediction.

The concept of B-frames and bidirectional coding was introduced in MPEG1 and MPEG2. This is illustrated in FIG. 2. In bidirectional coding, the coding order and temporal order is not necessarily the same. That is, a B-frame can be predicted based on both past and future frames relative to the B-frame. Predictions for a block to be coded may also use data from more than one previously reconstructed frame.

Both these aspects are illustrated in FIG. 2 showing a sequence of alternating p- and b-frames. The coding order in this example would be: 1p-3p-2b-5p-4b. Predictions can only be derived from P-frames, and P-frames are predicted from the previous P-frame only. B-frames may be predicted from the previous P-frame or from the next (temporally) P-frame or from both. This possibility comes from the fact that both the P-frame before and after are coded and reconstructed before the B-frame is to be predicted and coded.

In H.264/MPEG4-AVC the coding order and prediction structure is defined to be even more general. For example, the coding order may be defined almost arbitrarily and the prediction of a block is typically limited to use pixels from two previously decoded frames. However, the two frames need not be exactly one before and one after the frame to be coded.

One special feature of H.264/MPEG4-AVC is a so called "direct" prediction mode. In this mode the motion vectors to code a block in a B-frame are obtained from already known vectors. Two typical cases are often used. The first one is often referred to as "temporal direct". This means that the motion vector of a block in a P-frame is used to derive suitable downscaled motion vectors to predict the collocated block in the P-frame from two frames. Downscaling depends on the time position of the P-frame relative to the two frames. The second type is referred to as "spatial direct". Two motion vectors to predict a block in a B-frame from two frames are produced in a similar way. However, the motion vectors are adapted from motion vectors of previously coded blocks in the B-frame. The main benefit with spatial direct is to avoid saving motion vectors from the P-frame.

Generally, the flexible ordering and prediction from multiple frames may result in more efficient video coding. On the other hand, the complexity of the prediction process is also typically much increased.

Generally we will call the vectors used for downscaling "reference vectors". They will be vectors from a p-frame for temporal direct and vectors of previously coded blocks in the B-frame for "spatial direct".

SUMMARY OF THE INVENTION

The features defined in the independent claim enclosed characterize the method of the present invention.

In particular, the present invention discloses a method in video coding and decoding for calculating a prediction of a first block of pixels in a second video frame with a temporal position between a first and a third video frame from a first motion vector of pixel position components relative to spatial pixel positions of the first block referring the first video frame and a third motion vector of pixel position components relative to spatial pixel positions of the first block referring the third video frame, wherein a second block of pixels in the third video frame spatially collocated with the first block is predicted from a second motion vector of pixel position components relative to spatial pixel positions of the second block referring the first video frame, wherein the method includes the step of calculating the first and the third motion vectors from respective downscalings of said second motion vector according to the temporal position of the second video frame between the first and the third video frame so that the first motion vector equals the third plus the second motion vector, deriving a corrected third motion vector by rounding the pixel position components of the third motion vector to nearest integer values, defining a first error vector as a difference between the third motion vector and the corrected third motion vector, deriving a corrected first motion vector by subtracting the error vector from the first motion vector and quantifying according to a defined pixel position resolution of the first video frame, and calculating the prediction of the first block by averaging pixels of a block-sized area of the first frame to which the corrected first motion vector refers with corresponding pixels of a block-sized area of the third frame to which the corrected third motion refers.

DETAILED DESCRIPTION OF THE PRESENT INVENTION

In the following, the present invention will be discussed by describing a preferred embodiment. However, a person skilled in the art will realize other applications and modifications within the scope of the invention as defined in the enclosed independent claim.

The present invention addresses use of prediction from 2 frames with reduced complexity. As already mentioned, to increase coding efficiency, it is typical not only to use previously decoded pixel as prediction, but to use interpolated values between pixels. In H.264 a 6×6 tap filter is used on integer pixel positions to obtain the interpolated values. This interpolation process represents a large part of the complexity for coding decoding in H.264. When using two frames in predicting one frame, the complexity increases even further, because interpolation must be accomplished on both frames.

Note that the standards specify only the decoding operations. Hence an encoder may choose not to use interpolation in searching for good predictions. However, the decoder must be prepared for the worst case. It is therefore most relevant to talk about decoder complexity which means the resulting complexity regardless of what the encoder decides to do.

The present invention discloses a method of predicting a B-frame block from two motion vectors each referring to a respective P-frame at each temporal side of the B-frame and then averaging the predictions corresponding to the two motion vectors. The motion vectors are derived by downscaling the reference vectors defined above. At least one of the motion vectors is rounded to the nearest integer pixel position, so that no interpolation of pixel values is required in at least one of the P-frames to obtain the prediction. The rounding is compensated for by correcting the other motion vector accordingly. Tests and experiments have shown that this may result in very good coding performance and considerably lower decoding complexity.

Figure 1:
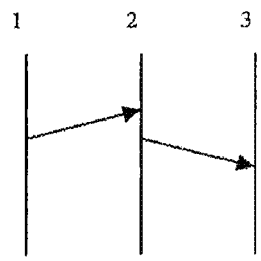
FIG. 1 is an example of a forward prediction.
Figure 2:
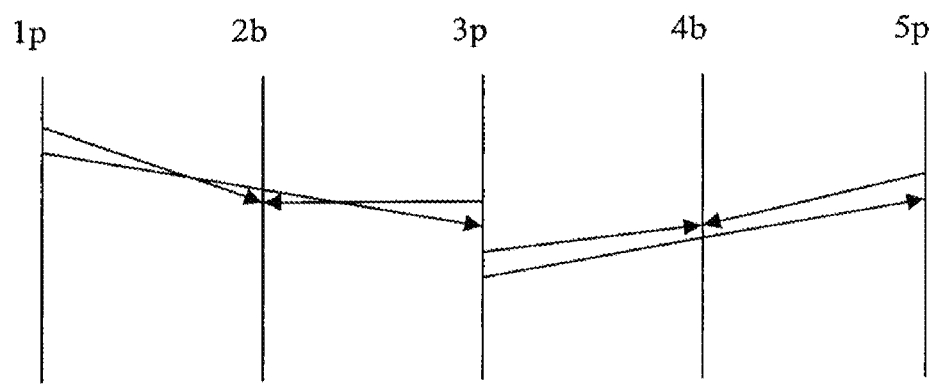
FIG. 2 is an example of bidirectional coding.
Figure 3:
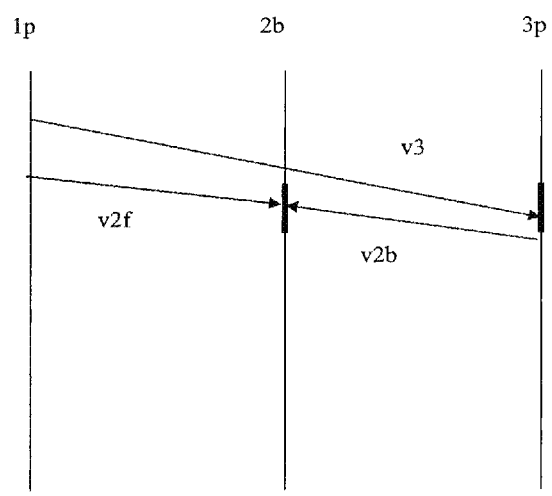
FIG. 3 is an example of prediction from two frames.

An example of the present invention is illustrated in FIG. 3. It shows three successive frames, to p-frames (1p and 3p), and one b-frame (2b). The arrows illustrate the motion vector v3 which is used to predict 3p from 1p (temporal direct) or alternatively a vector used previously for predicting a neighbour block of 2b (spatial direct), and the motion vectors v2f and v2b used to predict 2b from 1p and 3p. The vectors may typically be in units of ¼ pixels. All vectors typically are composed of a vertical and a horizontal component. For all the scaling operations described below, the two components are scaled separately. The expressions given below are assumed to be used separately on the two components. When making a prediction from two frames like this according the present invention, the prediction part from at least one of the frames must be non-interpolated whereas the prediction part from the other frame may or may not be interpolated values.

The bold lines in FIG. 3 indicate two spatially collocated blocks in frames 2b and 3p. The block in frame 2b may be predicted from a combination of pixels in frames 1p and 3p. The vectors to be used for this prediction are derived from the vector v3.

According to the embodiment of the present invention illustrated in FIG. 3, the vectors v2b and v2f are obtained in the following way:

v2b is obtained by scaling down v3 in an appropriate way depending on the temporal position of 2b relative to 3p and 1p. When 2b is temporarily located midway between 1p and 3p as in FIG. 3, then v2b≈−v3/2 because v2b points in the opposite direction of v3 and v2f, and because the temporal position of 2b is halfway between 1p and 3p. Note that if 2b is located differently, the scaling is modified accordingly to reflect the relative temporal location of 2b. When performing integer operations of ¼ pixel positions as described above, v2b will come out as an integer number in ¼ pixel units. If for example v3 is given as 14¼ pixel units in one direction, v2b comes out as 7 in the same direction, it means 7×¼ pixels≈1.75 pixels. However, according to the present invention, v2b is rounded to the nearest integer position, denoted $v2b_{corr}$. In this example it would be rounded to $v2b_{corr}$ 8×¼ pixels=2 pixels.

Obtaining v2f must then compensate for the rounding of v2b. When 2b is exactly midway between 1p and 3p, an exact compensation will be to define the corrected version $v2f_{corr}$ of v2f to be $v2f_{corr}=-v2b_{corr}$. By such a procedure, the final prediction is almost as good as if v2b and v2f were obtained without rounding.

In this simple case both $v2b_{corr}$ and $v2f_{corr}$ would end up being integer values. This could be different if 2b was not located midway between 1p and 3p.

When the two vectors are calculated as described above, the respective areas of 1p and 3p, to which the prediction of the block in 2b refers, will be defined. The final prediction is typically obtained by averaging pixel by pixel of the resulting areas of 3p and 1p by using $v2b_{corr}$ referring to 3p and $v2f_{corr}$ referring to 1p.

Figure 4:
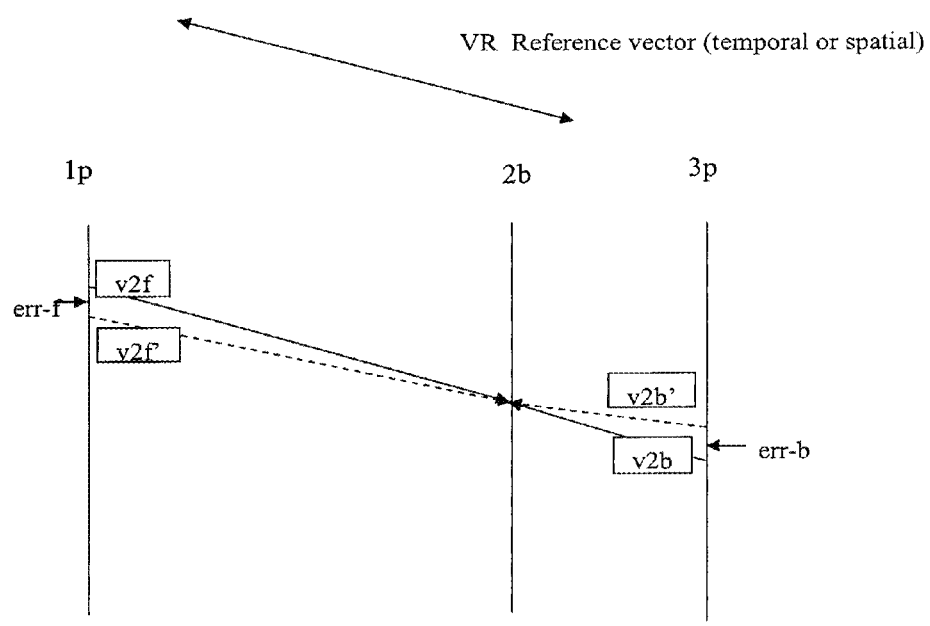
FIG. 4 is an example of prediction involving two P-frames and a B-frame.

FIG. 4 illustrate a more general example of the present invention with two P-frames (1p and 3p) and a B-frame (2b) temporally in between, but not necessarily in the midway. VR is the reference vector to be used to produce vectors for direct mode prediction. It is shown in the figure with arrow tips at both ends indicating that VR may be a forward or backward vector. The scaling process uses only the orientation of VR, not whether it points forward or backward. Pair(s) of vectors are produced for direct prediction, one of the pair referring to 1p and the other referring to 3p. (v2f, v2b) in the figure is such a pair. It is obtained by scaling down the size of VR in such a way that v2f and v2b have the same orientation as VR seen from in the temporal plan (as in FIG. 4).

(v2f, v2b) are not quantized. This has to be done, typically to result in ¼, ½, or 1 pixel units and is performed on the horizontal and vertical components of the vectors separately. According to the present invention we start with quantifying one vector, preferably the one pointing to the closest P-frame. In the FIG. 4 it will be v2b. Quantifying of one component (horizontal of vertical) is performed like in the following:

v2b is quantized to the nearest integer pixel value. The result is v2b'. The difference is defined to be v2b−v2b'=errb. v2f is then quantized, either to the nearest integer pixel value or to ¼ or ½ pixel values, to fit into the interpolation of 1p. This will result in a similar error: v2f−v2f'=errf The quantization process is modified so that |errb+errf| becomes small or minimum. In this way errf to some extent compensates for errb. Deriving v2f could also be interpreted as subtracting errb from v2f and then quantifying the result according to the resolution of 1p after interpolation.

In the special case depicted in FIG. 3, when 2b is located temporally midway between 1p and 3p the result will be:

$$v2f=-v2b$$

$$v2f'=-v2b'$$

$$err\text{-}b+err\text{-}b=0$$

Both v2fb' and v2f' will be in integer pixel units.

Generally, the predictions related to at least one of v2f and v2b are obtained by integer pixel vector components. Predictions related to the other vector may be in fractional units but the value is modified according to the rounding error resulting from calculation the first vector.

The present invention can also be used in the case of "spatial direct" as well as in the case of "temporal direct".

The least complex embodiment case of the present invention would be when all motion vectors used for b-frame coding were in integer pixel resolution. This could be the case both if the vectors are derived from other vectors (direct prediction mode) or if the vectors are the results of individual motion vector search.

The main advantages of the present invention are good coding performance and at the same time no pixel interpolation is needed to obtain the prediction part at least from one of the p-frames.

The invention claimed is:

1. A method comprising:
    calculating a prediction of a first block of pixels in a second video frame with a temporal position between a first and a third video frame from a first motion vector of pixel position components relative to spatial pixel positions of the first block referring to the first video frame and a third motion vector of pixel position components relative to spatial pixel positions of the first block referring the third video frame, wherein a second block of pixels in the third video frame spatially collocated with the first block is predicted from a second motion vector of pixel position components relative to spatial pixel positions of the second block referring the first video frame,
    wherein said calculating the prediction of the first block of pixels in the second video frame includes
        calculating the first and the third motion vectors from respective downscalings of said second motion vector according to the temporal position of the second video frame between the first and the third video frame so that the first motion vector equals the third motion vector plus the second motion vector,
        deriving a corrected third motion vector by rounding the pixel position components of the third motion vector to nearest integer values,
        defining a first error vector as a difference between the third motion vector and the corrected third motion vector,
        deriving a corrected first motion vector by subtracting the error vector from the first motion vector and quantifying according to a defined pixel position resolution of the first video frame, and
        averaging pixels of a block-sized area of the first frame to which the corrected first motion vector refers with corresponding pixels of a block-sized area of the third frame to which the corrected third motion vector refers.

2. The method according to claim 1, wherein
    the temporal position of the second video frame is halfway between the first and the third video frames, and the step of deriving the corrected first motion vector includes defining the corrected first motion vector to be opposite of the corrected third motion vector.

* * * * *